US012249765B2

(12) United States Patent
Rowell et al.

(10) Patent No.: US 12,249,765 B2
(45) Date of Patent: Mar. 11, 2025

(54) REFLECTOR DISH AND METHOD OF MANUFACTURING THE SAME

(71) Applicant: Rohde & Schwarz GmbH & Co. KG, Munich (DE)

(72) Inventors: Corbett Rowell, Prien am Chiemsee (DE); Christian Ebner, Boebrach (DE); Martin Kilger, Drachselsried (DE); Constantin Sinn, Munich (DE)

(73) Assignee: Rohde & Schwarz GmbH & Co. KG, Munich (DE)

( * ) Notice: Subject to any disclaimer, the term of this patent is extended or adjusted under 35 U.S.C. 154(b) by 264 days.

(21) Appl. No.: 17/888,181

(22) Filed: Aug. 15, 2022

(65) Prior Publication Data

US 2024/0055773 A1 Feb. 15, 2024

(51) Int. Cl.
*H01Q 15/16* (2006.01)

(52) U.S. Cl.
CPC .................................... *H01Q 15/16* (2013.01)

(58) Field of Classification Search
CPC .......... H01Q 1/28; H01Q 15/14; H01Q 15/16; H01Q 15/162; H01Q 19/10; H01Q 19/12
See application file for complete search history.

(56) References Cited

U.S. PATENT DOCUMENTS 3,503,072 A * 3/1970 Thompson ............... B64G 1/22 343/705
4,585,317 A * 4/1986 Hodges ................... F24S 23/82 343/840

(Continued)

FOREIGN PATENT DOCUMENTS

CN 110085963 B 1/2021
EP 1043802 A2 * 10/2000 ............. H01Q 1/288
FR 1059127 A 3/1954

OTHER PUBLICATIONS

Lehman et al., "Precision segmented reflectors for space applications", retrieved from https://www.spiedigitallibrary.org/conference-proceedings-of-spie/1271/0000/Precision-segmented-reflectors-for-space-applications/10.1117/12.20407.short?SSO=1, Aug. 1, 1990, 3 pages.

(Continued)

*Primary Examiner* — Tho G Phan
(74) *Attorney, Agent, or Firm* — DITTHAVONG, STEINER, & MLOTKOWSKI

(57) ABSTRACT

Disclosed is a method of manufacturing a reflector dish for a compact antenna test range, CATR, and a reflector dish being obtainable by the method. The method comprises providing a first workpiece having an axis of symmetry, and an unprocessed peripheral edge with respect to the axis of symmetry fitting within a maximum milling area of a milling device. The method further comprises milling a concave parabolic frontal surface into the first workpiece in accordance with the axis of symmetry. The method further comprises milling a peripheral surface into the first workpiece with respect to the axis of symmetry. The method further comprises providing four second workpieces. The method further comprises milling a frontal surface into the respective second workpiece. The method further comprises milling a peripheral surface into the respective second workpiece. The method further comprises merging the first workpiece and the second workpieces to form a rectangular main body, wherein the peripheral surfaces abut seamlessly with one another and the frontal surfaces merge seamlessly into one another.

15 Claims, 4 Drawing Sheets

(56) References Cited

U.S. PATENT DOCUMENTS

| | | | | |
|---|---|---|---|---|
| 4,743,144 | A * | 5/1988 | Shikata | B23C 5/2226<br>407/62 |
| 6,191,757 | B1 | 2/2001 | Bassily et al. | |
| 9,825,371 | B2 | 11/2017 | Mayeux | |
| 11,699,860 | B1 * | 7/2023 | Scott | H01Q 19/19<br>343/840 |
| 2016/0226135 | A1 | 8/2016 | Grangerat | |
| 2016/0329640 | A1 | 11/2016 | Collot | |

OTHER PUBLICATIONS

Lanika Solutions, "Introduction to Segmented Reflector Design with ReflectorCAD and the ASAP ELTM", retrieved from https://www.youtube.com/watch?v=jv2aEWol-gE, Apr. 28, 2016, 3 pages.

* cited by examiner

REFLECTOR DISH AND METHOD OF MANUFACTURING THE SAME

FIELD OF THE INVENTION

The present disclosure relates to reflective aerials, and in particular to a reflector dish and a method of manufacturing the same.

BACKGROUND OF THE INVENTION

Manufacturing a parabolic reflector dish that dimensionally exceeds a rectangular maximum milling area of the available milling machine requires the reflector dish to be made in pieces and then assembled onsite. The surfaces of the reflector dish as a whole therefore do not undergo an joint passivation or electroplating against oxidation. Instead, the surfaces are typically coated with mineral oil, which is a rather messy solution. Generally there are two known manufacturing methods: 1) milling a one-piece parabolic section and attaching separate rolled edges or serrated edges, resulting in a relatively small parabolic section, or 2) milling out individual rectangular pieces of the reflector dish, which creates abutting edges inside the parabolic section. Especially for large reflectors, intensive human labor may be required to move the reflector in between milling stages.

SUMMARY OF THE INVENTION

There is a need to improve a manufacturing of large reflector dishes using existing milling equipment.

This is achieved by the embodiments as defined by the appended independent claims. Preferred embodiments are set forth in the dependent claims and in the following description and drawings.

A first aspect of the present disclosure relates to a method of manufacturing a reflector dish for a compact antenna test range, CATR. The method comprises providing a first workpiece having an axis of symmetry, and an unprocessed peripheral edge with respect to the axis of symmetry fitting within a maximum milling area of a milling device. The method further comprises milling a concave parabolic frontal surface into the first workpiece in accordance with the axis of symmetry. The method further comprises milling a peripheral surface into the first workpiece with respect to the axis of symmetry. The method further comprises providing four second workpieces. The method further comprises milling a frontal surface into the respective second workpiece. The method further comprises milling a peripheral surface into the respective second workpiece. The method further comprises merging the first workpiece and the second workpieces to form a rectangular main body, wherein the peripheral surfaces abut seamlessly with one another and the frontal surfaces merge seamlessly into one another.

According to an implementation, the maximum milling area may have a rectangular shape.

According to an implementation, the peripheral surface of the first workpiece may be radially bounded by a circular peripheral edge of the concave parabolic frontal surface with respect to the axis of symmetry.

According to an implementation, the peripheral surface of the first workpiece may comprise a first number of cylindrically convex sections with respect to the axis of symmetry.

According to an implementation, the peripheral surface of the first workpiece may comprise a second number of cylindrically concave sections with respect to the axis of symmetry, the second number may be twice the first number.

According to an implementation, the peripheral surface of the respective second workpiece may comprise mutually perpendicular flat sections.

According to an implementation, the milling of the peripheral surface into the first workpiece may further comprise milling a rolled edge into the peripheral surface of the first workpiece; and the milling the peripheral surface into the respective second workpiece may further comprise milling a rolled edge into the peripheral surface of the respective second workpiece.

According to an implementation, the milling of the peripheral surface into the first workpiece may further comprise milling a serrated edge into the peripheral surface of the first workpiece; and the milling of the peripheral surface into the respective second workpiece may further comprise milling a serrated edge into the peripheral surface of the respective second workpiece.

According to an implementation, the method may further comprise passivating or electroplating the rectangular main body of the reflector dish.

A second aspect of the present disclosure relates to a reflector dish for a compact antenna test range, CATR. The reflector dish comprises a rectangular main body, comprising a first workpiece and four second workpieces. The first workpiece has an axis of symmetry, a peripheral edge with respect to the axis of symmetry fitting within a maximum milling area of a milling device when unprocessed, a concave parabolic frontal surface in accordance with the axis of symmetry, and a peripheral surface with respect to the axis of symmetry. The four second workpieces respectively have a frontal surface and a peripheral surface. The peripheral surfaces abut seamlessly with one another; and the frontal surfaces merge seamlessly into one another.

According to an implementation, the maximum milling area may have a rectangular shape.

According to an implementation, the peripheral surface of the first workpiece may be radially bounded by a circular peripheral edge of the concave parabolic frontal surface with respect to the axis of symmetry.

According to an implementation, the peripheral surface of the first workpiece may comprise a first number of cylindrically convex sections with respect to the axis of symmetry.

According to an implementation, the peripheral surface of the first workpiece may comprise a second number of cylindrically concave sections with respect to the axis of symmetry, the second number may be twice the first number.

According to an implementation, the peripheral surfaces of the first workpiece and the second workpieces may respectively comprise a rolled edge.

According to an implementation, the peripheral surfaces of the first workpiece and the second workpieces may respectively comprise a serrated edge.

According to an implementation, the peripheral surface of the respective second workpiece may comprise mutually perpendicular flat sections.

According to an implementation, the rectangular main body of the reflector dish comprises a passivation or electroplating.

A third aspect of the present disclosure relates to a reflector dish, being obtainable by the method of the first aspect or any of its implementations.

BRIEF DESCRIPTION OF THE DRAWINGS

The above-described aspects and implementations will now be explained with reference to the accompanying drawings, in which the same or similar reference numerals designate the same or similar elements.

The features of these aspects and implementations may be combined with each other unless specifically stated otherwise.

Figure 1:
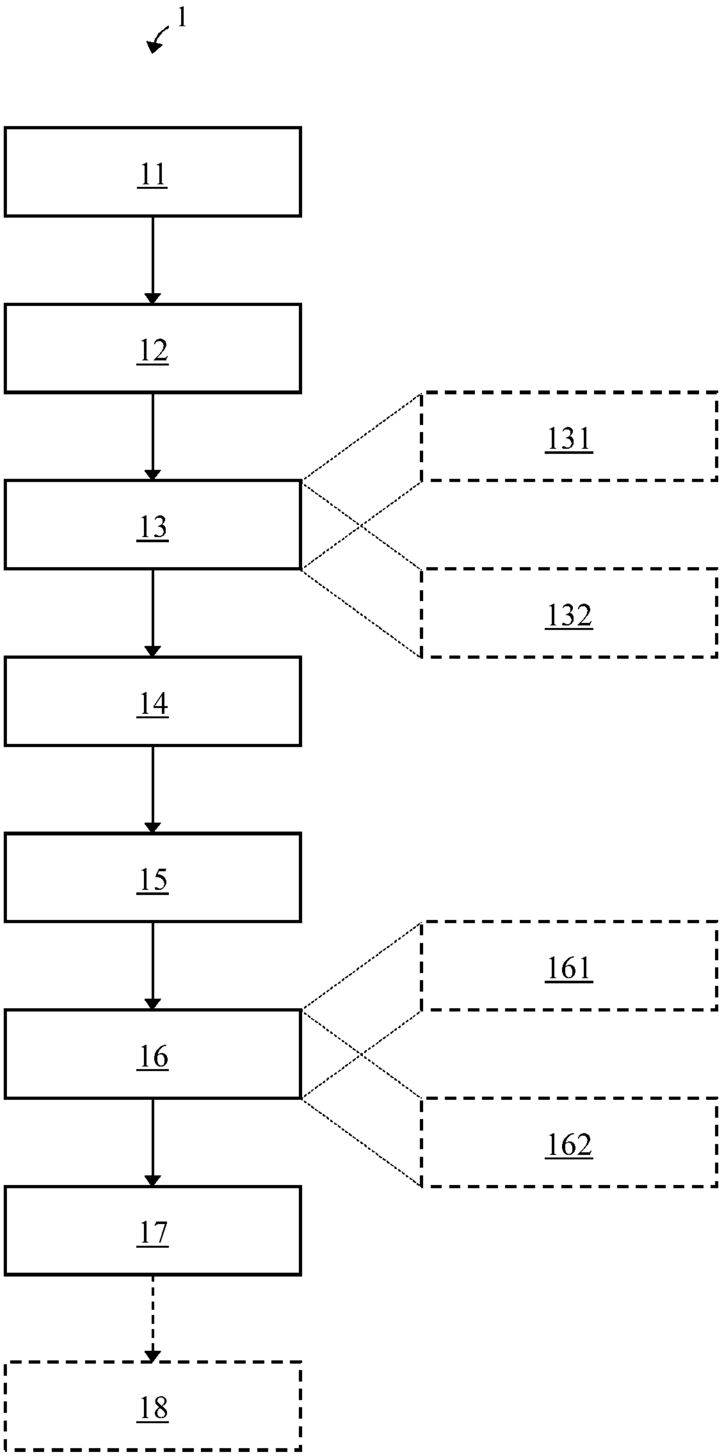

The drawings are to be regarded as being schematic representations, and elements illustrated in the drawings are not necessarily shown to scale. Rather, the various elements are represented such that their function and general purpose become apparent to those skilled in the art.

FIG. 1 illustrates a method in accordance with the present disclosure of manufacturing a reflector dish for a compact antenna test range (CATR);

FIGS. 2-5 illustrate a first implementation of a reflector dish in accordance with the present disclosure;

FIGS. 6-9 illustrate a second implementation of a reflector dish in accordance with the present disclosure; and FIGS. 10-13 illustrate a third implementation of a reflector dish in accordance with the present disclosure.

DETAILED DESCRIPTION OF PREFERRED EMBODIMENTS

FIG. 1 illustrates a method 1 in accordance with the present disclosure of manufacturing a reflector dish 2; 2' for a compact antenna test range (CATR).

A reflector dish as used herein may refer to an aerial device having a reflective surface being designed to collect or project energy such as radio waves.

A CATR as used herein may refer to a shielded anechoic measurement chamber comprising a source antenna (feed) and a parabolic reflector, wherein the source antenna is configured to radiate a spherical wave in a direction of the parabolic reflector, which is in turn configured to collimate the spherical wave into a planar wave for illumination of a device under test (DUT). Thereby, large antennas/DUTs may be measured at a significantly shorter distance than would be necessary in a far-field test range.

The method 1 comprises providing 11 a first workpiece 21; 21' having an axis A of symmetry, and an unprocessed peripheral edge 211; 211' with respect to the axis A of symmetry fitting within a maximum milling area 3 of a milling device. In particular, the first workpiece 21; 21' may comprise a metallic substrate.

A maximum milling area as used herein may refer to a dimensional constraint imposed on a workpiece to be processed by a milling machine. Usually the maximum milling area relates to dimensions of a milling table onto which the workpiece is placed for processing.

The maximum milling area 3 may have a rectangular shape.

The method 1 further comprises milling 12 a concave parabolic frontal surface 212; 212' into the first workpiece 21; 21' in accordance with the axis A of symmetry.

Milling as used herein may refer to a process of machining using a rotary cutter to remove material by advancing the cutter into a workpiece. In particular, this may be done by varying direction on one or several axes.

Concave as used herein may refer to a surface that is recessed into a workpiece (away from a center of curvature, away from a focus, and away from incident light).

Parabolic as used herein may refer to being shaped in accordance with a parabola. A parabolic surface/reflector may thus refer to a circular paraboloid, that is, a surface generated by a parabola revolving around its axis. The parabolic surface/reflector is configured to transform an incoming plane wave travelling along the axis into a spherical wave converging toward the focus. Conversely, a spherical wave generated by a point source placed in the focus is reflected into a plane wave propagating as a collimated beam along the axis.

Frontal as used herein may refer to one of the six directions of a Cartesian coordinate system, and to one of the two directions of a given axis of said Cartesian coordinate system, which may form an axis of symmetry for a particular workpiece.

The method 1 further comprises milling 13 a peripheral surface 213; 213' into the first workpiece 21; 21' with respect to the axis A of symmetry.

Peripheral as used herein may refer to a circumferential lateral direction with respect to an axis of symmetry for a particular workpiece.

The milling 13 of the peripheral surface 213; 213' into the first workpiece 21; 21' may further comprise milling 131 a rolled edge 2133, 2133' into the peripheral surface 213; 213' of the first workpiece 21; 21', or milling 132 a serrated edge 2134 into the peripheral surface 213; 213' of the first workpiece 21; 21'.

A rolled edge as used herein may refer to a reflector edge treatment wherein the reflector has a rounded surface all along its rim such that edge-generated diffractive fields are directed away from the DUT into non-critical areas of the anechoic chamber.

A serrated edge as used herein may refer to a reflector edge treatment wherein where the reflector has sharp indentations all along its rim such that edge-generated diffractive fields are directed away from the DUT.

The peripheral surface 213; 213' of the first workpiece 21; 21' may be radially bounded by a circular peripheral edge 4 of the concave parabolic frontal surface 212; 212' with respect to the axis A of symmetry. In other words, a surface edge formed in the first workpiece 21; 21' by the concave parabolic frontal surface 212; 212' defines a circumference of the circular peripheral edge 4.

The peripheral surface 213 of the first workpiece 21 may comprise a first number of cylindrically convex sections 2131 with respect to the axis A of symmetry.

The peripheral surface 213' of the first workpiece 21' may comprise a second number of cylindrically concave sections 2131' with respect to the axis A of symmetry, the second number may be twice the first number. In particular, the cylindrically concave sections 2131' may be formed by symmetric bisection of the cylindrically convex sections 2131 with respect to the axis A of symmetry and inversion of the curvatures of the bisections. This may further minimize a diffraction into a quiet zone (QZ), i.e., the parabolic section.

The method 1 further comprises providing 14 four second workpieces 22; 22'. In particular, the second workpieces 22; 22' may respectively comprise a metallic substrate.

The method 1 further comprises milling 15 a frontal surface 221; 221' into the respective second workpiece 22; 22'.

The method 1 further comprises milling 16 a peripheral surface 222; 222' into the respective second workpiece 22; 22'.

The milling 16 the peripheral surface 222, 222' into the respective second workpiece 22; 22' may further comprise milling 161 a rolled edge 2221, 2221' into the peripheral surface 222, 222' of the respective second workpiece 22; 22', or milling 162 a serrated edge 2222 into the peripheral surface 222, 222' of the respective second workpiece 22; 22'.

The peripheral surface 222, 222' of the respective second workpiece 22; 22' may comprise mutually perpendicular flat sections 2221, 2221'.

The method 1 further comprises merging 17 the first workpiece 21; 21' and the second workpieces 22; 22' to form a rectangular main body, wherein the peripheral surfaces 213, 222; 213', 222' abut seamlessly with one another and the frontal surfaces 212; 221; 212', 221' merge seamlessly into one another.

The method 1 may further comprise passivating or electroplating 18 the rectangular main body of the reflector dish 2; 2'. For example, the electroplating 18 may form a gold plating.

It is thus proposed to produce pieces of the reflector as determined by an effective milling sphere (bounded by the circular peripheral edge 4) with the four corners as separate pieces. The milling of the first workpiece 21; 21' does not place any boundaries inside the quiet zone (parabolic section). As the entire reflector dish 2, 2' is smaller than the passivation equipment, it can be assembled in the factory and the entire reflector may be passivated (no mineral oil required). The requirement of extra labor to move the reflector is reduced, and the manufacture of the reflector dish 2; 2' will be more cost-efficient.

FIGS. 2-5 illustrate a first implementation of a reflector dish 2 in accordance with the present disclosure.

The reflector dish 2 is obtainable by the method 1 of the first aspect, as illustrated in FIG. 1. More specifically, FIGS. 2-5 respectively illustrate a condition of the reflector dish 2 after steps 12, 13, 16 and 18 of the method 1 of the first aspect.

Figure 5:
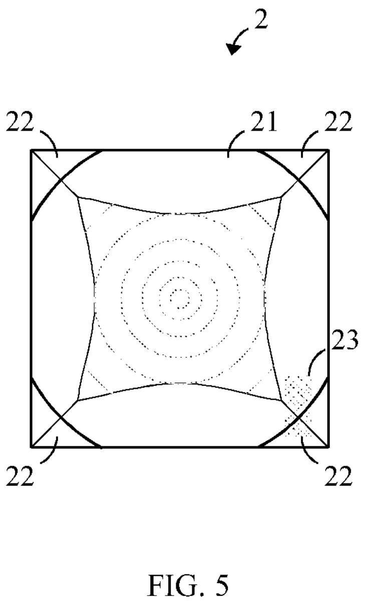

FIG. 5 illustrates that the reflector dish 2 comprises a rectangular main body, comprising a first workpiece 21 and four second workpieces 22.

The rectangular main body of the reflector dish 2 may comprise a passivation or electroplating 23, merely being suggested in a corner of FIG. 5 by a dotted pattern.

Figure 2:
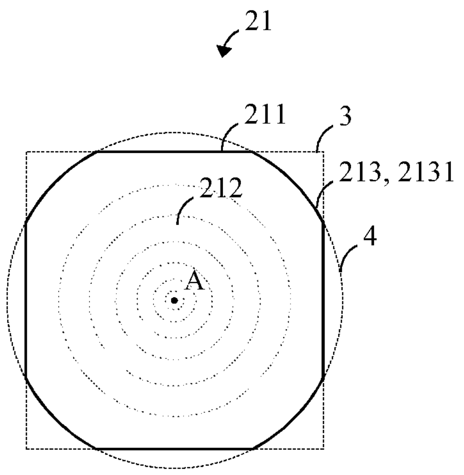
Figure 3:
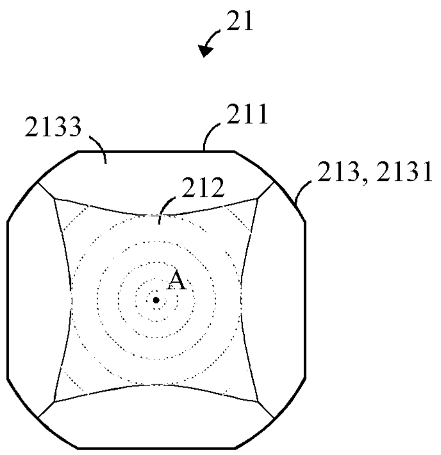

In accordance with FIGS. 2-3, the first workpiece 21 has an axis A of symmetry that extends perpendicularly to the plane of the drawings in FIGS. 2-3.

In accordance with FIG. 2, the unprocessed first workpiece 21 has a peripheral edge 211 with respect to the axis A of symmetry that fits within a maximum milling area 3 of a milling device. In particular, the maximum milling area 3 may have a rectangular or quadratic shape.

In accordance with FIGS. 2, 3 and 5, the first workpiece 21 further has a concave parabolic frontal surface 212 in accordance with the axis A of symmetry, said parabolic shape being suggested by concentric circles around the axis A of symmetry.

In accordance with FIGS. 2-3, the first workpiece 21 further has a peripheral surface 213 with respect to the axis A of symmetry.

In accordance with FIG. 2, the peripheral surface 213 of the first workpiece 21 may be radially bounded by a circular peripheral edge 4 of the concave parabolic frontal surface 212 with respect to the axis A of symmetry.

In accordance with FIGS. 2-3, the peripheral surface 213 of the first workpiece 21 may comprise a first number of four cylindrically convex sections 2131 with respect to the axis A of symmetry.

Figure 4:
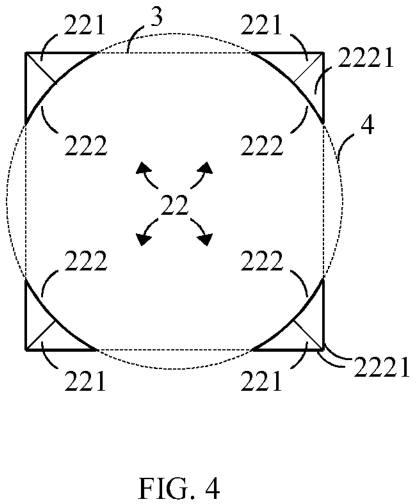

In accordance with FIG. 4, the four second workpieces 22 respectively have a frontal surface 221 and a peripheral surface 222.

In accordance with FIGS. 3-4, the peripheral surfaces 213, 222 of the first workpiece 21 and the second workpieces 22 may respectively comprise a rolled edge 2133, 2221.

In accordance with FIGS. 4-5, the peripheral surface 222 of the respective second workpiece 22 may comprise mutually perpendicular flat sections 2221, which form the corners of the rectangular main body.

In accordance with FIG. 5, the peripheral surfaces 213, 222 of the first workpiece 21 and the second workpieces 22 abut seamlessly with one another; and the frontal surfaces 212; 221 of the first workpiece 21 and the second workpieces 22 merge seamlessly into one another.

FIGS. 6-9 illustrate a second implementation of a reflector dish 2' in accordance with the present disclosure.

The reflector dish 2' is obtainable by the method 1 of the first aspect, as illustrated in FIG. 1. More specifically, FIGS. 6-9 respectively illustrate a condition of the reflector dish 2 after steps 12, 13, 16 and 18 of the method 1 of the first aspect.

Figure 9:
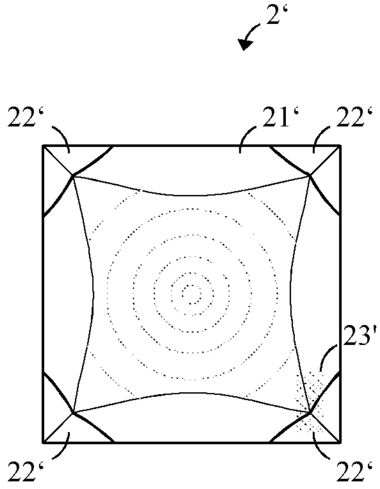

FIG. 9 illustrates that the reflector dish 2' comprises a rectangular main body, comprising a first workpiece 21' and four second workpieces 22'.

The rectangular main body of the reflector dish 2' may comprise a passivation or electroplating 23', merely being suggested in a corner of FIG. 9 by a dotted pattern.

Figure 6:
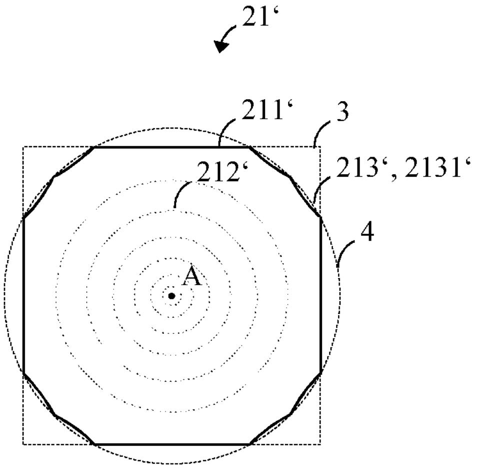
Figure 7:
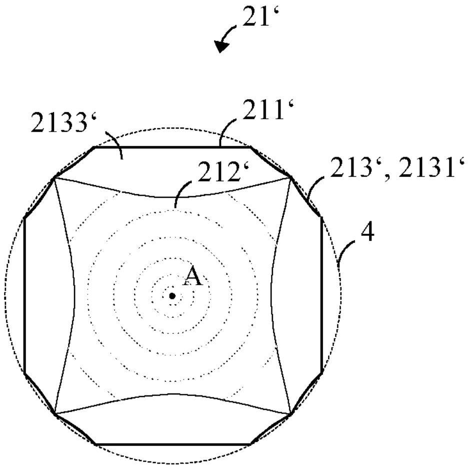

In accordance with FIGS. 6-7, the first workpiece 21' has an axis A of symmetry that extends perpendicularly to the plane of the drawings in FIGS. 6-7.

In accordance with FIG. 6, the unprocessed first workpiece 21' has a peripheral edge 211' with respect to the axis A of symmetry that fits within the maximum milling area 3 of a milling device.

In particular, the maximum milling area 3 may have a rectangular or quadratic shape.

In accordance with FIGS. 6, 7 and 9, the first workpiece 21' further has a concave parabolic frontal surface 212' in accordance with the axis A of symmetry, said parabolic shape being suggested by concentric circles around the axis A of symmetry.

In accordance with FIGS. 6-7, the first workpiece 21 further has a peripheral surface 213' with respect to the axis A of symmetry.

In accordance with FIG. 6, the peripheral surface 213' of the first workpiece 21 may be radially bounded by the circular peripheral edge 4 of the concave parabolic frontal surface 212' with respect to the axis A of symmetry.

In accordance with FIGS. 6-7, the peripheral surface 213' of the first workpiece 21' may comprise a second number of eight cylindrically concave sections 2131' with respect to the axis A of symmetry. In other words, the second number of eight cylindrically concave sections 2131' of the second implementation is twice the first number of four cylindrically convex sections 2131 of the first implementation.

Figure 8:
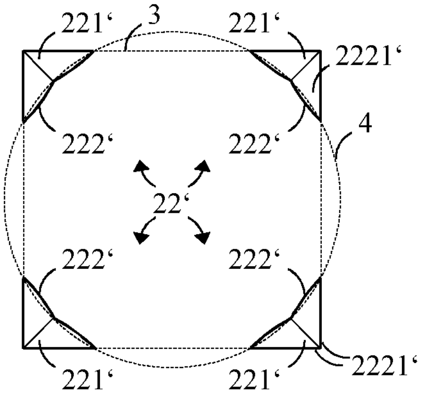

In accordance with FIG. 8, the four second workpieces 22' respectively have a frontal surface 221' and a peripheral surface 222'.

In accordance with FIGS. 7-8, the peripheral surfaces 213', 222' of the first workpiece 21' and the second workpieces 22' may respectively comprise a rolled edge 2133', 2221'.

In accordance with FIGS. 8-9, the peripheral surface 222' of the respective second workpiece 22' may comprise mutually perpendicular flat sections 2221', which form the corners of the rectangular main body.

In accordance with FIG. 9, the peripheral surfaces 213', 222' of the first workpiece 21' and the second workpieces 22' abut seamlessly with one another; and the frontal surfaces 212', 221' of the first workpiece 21' and the second workpieces 22' merge seamlessly into one another.

FIGS. 10-13 illustrate a third implementation of a reflector dish 2 in accordance with the present disclosure.

The reflector dish 2 is obtainable by the method 1 of the first aspect, as illustrated in FIG. 1. More specifically, FIGS. 10-13 respectively illustrate a condition of the reflector dish 2 after steps 12, 13, 16 and 18 of the method 1 of the first aspect.

Figure 13:
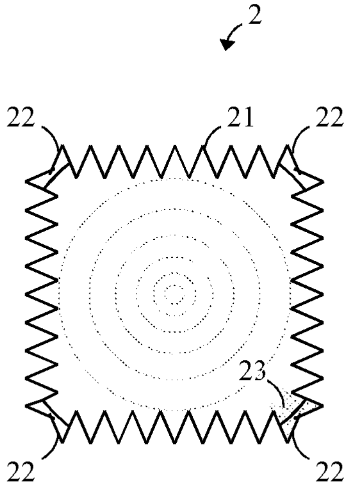

FIG. 13 illustrates that the reflector dish 2 comprises a rectangular main body, comprising a first workpiece 21 and four second workpieces 22.

In accordance with FIG. 13, the second workpieces 22 form the corners of the rectangular main body.

The rectangular main body of the reflector dish 2 may comprise a passivation or electroplating 23, merely being suggested in a corner of FIG. 13 by a dotted pattern.

Figure 10:
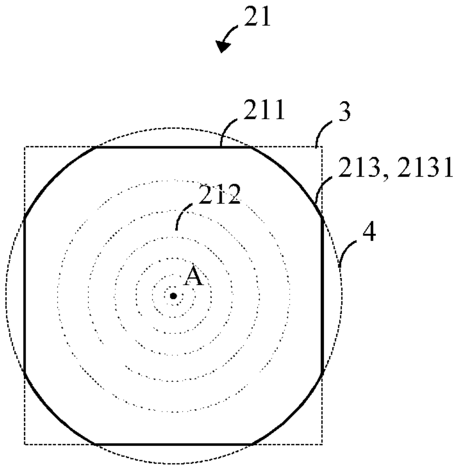
Figure 11:
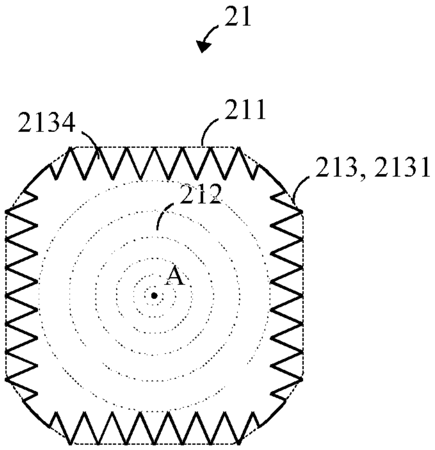

In accordance with FIGS. 10-11, the first workpiece 21 has an axis A of symmetry that extends perpendicularly to the plane of the drawings in FIGS. 10-11.

In accordance with FIG. 10, the unprocessed first workpiece 21 has a peripheral edge 211 with respect to the axis A of symmetry that fits within a maximum milling area 3 of a milling device.

In particular, the maximum milling area 3 may have a rectangular or quadratic shape.

In accordance with FIGS. 10, 11 and 13, the first workpiece 21 further has a concave parabolic frontal surface 212 in accordance with the axis A of symmetry, said parabolic shape being suggested by concentric circles around the axis A of symmetry.

In accordance with FIGS. 10-11, the first workpiece 21 further has a peripheral surface 213 with respect to the axis A of symmetry.

In accordance with FIG. 10, the peripheral surface 213 of the first workpiece 21 may be radially bounded by a circular peripheral edge 4 of the concave parabolic frontal surface 212 with respect to the axis A of symmetry.

In accordance with FIGS. 10-11, the peripheral surface 213 of the first workpiece 21 may comprise a first number of four cylindrically convex sections 2131 with respect to the axis A of symmetry.

Figure 12:
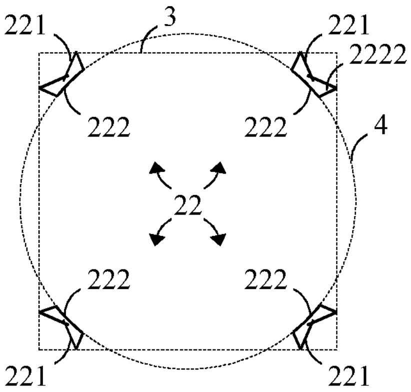

In accordance with FIG. 12, the four second workpieces 22 respectively have a frontal surface 221 and a peripheral surface 222.

In accordance with FIGS. 11-12, the peripheral surfaces 213, 222 of the first workpiece 21 and the second workpieces 22 may respectively comprise a serrated edge 2134, 2222.

In accordance with FIG. 5, the peripheral surfaces 213, 222 of the first workpiece 21 and the second workpieces 22 abut seamlessly with one another; and the frontal surfaces 212; 221 of the first workpiece 21 and the second workpieces 22 merge seamlessly into one another.

While various embodiments of the present disclosure have been described above, it should be understood that they have been presented by way of example only, and not limitation. Numerous changes to the disclosed embodiments can be made in accordance with the disclosure herein without departing from the spirit or scope of the disclosure. Thus, the breadth and scope of the present disclosure should not be limited by any of the above described embodiments. Rather, the scope of the disclosure should be defined in accordance with the following claims and their equivalents.

Although the present disclosure has been illustrated and described with respect to one or more implementations, equivalent alterations and modifications will occur to others skilled in the art upon the reading and understanding of this specification and the annexed drawings. In addition, while a particular feature of the present disclosure may have been disclosed with respect to only one of several implementations, such feature may be combined with one or more other features of the other implementations as may be desired and advantageous for any given or particular application. The phrase ‘at least one of A and B’ may stand for “and/or”.

The invention claimed is:

1. A method of manufacturing a reflector dish for a compact antenna test range, CATR, comprising providing a first workpiece having an axis of symmetry, and an unprocessed peripheral edge with respect to the axis of symmetry fitting within a maximum milling area of a milling device;

milling a concave parabolic frontal surface into the first workpiece in accordance with the axis of symmetry;

milling a peripheral surface into the first workpiece with respect to the axis of symmetry;

providing four second workpieces;

milling a frontal surface into the respective second workpiece; and milling a peripheral surface into the respective second workpiece; and merging the first workpiece and the second workpieces to form a rectangular main body, wherein the peripheral surfaces abut seamlessly with one another and the frontal surfaces merge seamlessly into one another, the peripheral surface of the first workpiece comprising a first number of cylindrically convex sections with respect to the axis of symmetry, the peripheral surface of the first workpiece comprising a second number of cylindrically concave sections with respect to the axis of symmetry, the second number being twice the first number, and the second number of cylindrically concave sections being formed by symmetric bisection of the first number of cylindrically convex sections with respect to the axis of symmetry and inversion of the curvatures of the bisections.

2. The method of claim 1, the maximum milling area having a rectangular shape.

3. The method of claim 1, the peripheral surface of the first workpiece being radially bounded by a circular peripheral edge of the concave parabolic frontal surface with respect to the axis of symmetry.

4. The method of claim 1, the peripheral surface of the respective second workpiece comprising mutually perpendicular flat sections.

5. The method of claim 1, the milling of the peripheral surface into the first workpiece further comprising milling a rolled edge into the peripheral surface of the first workpiece; and the milling of the peripheral surface into the respective second workpiece further comprising milling a rolled edge into the peripheral surface of the respective second workpiece.

6. The method of claim 1, the milling of the peripheral surface into the first workpiece further comprising milling a serrated edge into the peripheral surface of the first workpiece; and the milling of the peripheral surface into the respective second workpiece further comprising milling a serrated edge into the peripheral surface of the respective second workpiece.

7. The method of claim 1, further comprising
passivating or electroplating the main body of the reflector dish.

8. A reflector dish, being obtainable by the method of claim 1.

9. A reflector dish for a compact antenna test range, CATR, comprising
a rectangular main body, comprising
a first workpiece, and
four second workpieces;
the first workpiece having
an axis of symmetry,
a peripheral edge with respect to the axis of symmetry fitting within a maximum milling area of a milling device when unprocessed,
a concave parabolic frontal surface in accordance with the axis of symmetry, and
a peripheral surface with respect to the axis of symmetry; and
the four second workpieces respectively having
a frontal surface and
a peripheral surface;
the peripheral surfaces abutting seamlessly with one another, and
the frontal surfaces merging seamlessly into one another,
the peripheral surface of the first workpiece comprising a first number of cylindrically convex sections with respect to the axis of symmetry,
the peripheral surface of the first workpiece comprising a second number of cylindrically concave sections with respect to the axis of symmetry, the second number being twice the first number, and
the second number of cylindrically concave sections being formed by symmetric bisection of the first number of cylindrically convex sections with respect to the axis of symmetry and inversion of the curvatures of the bisections.

10. The reflector dish of claim 9,
the maximum milling area having a rectangular shape.

11. The reflector dish of claim 9,
the peripheral surface of the first workpiece being radially bounded by a circular peripheral edge of the concave parabolic frontal surface with respect to the axis of symmetry.

12. The reflector dish of claim 9,
the peripheral surfaces of the first workpiece and the second workpieces respectively comprising a rolled edge.

13. The reflector dish of claim 9,
the peripheral surfaces of the first workpiece and the second workpieces respectively comprising a serrated edge.

14. The reflector dish of claim 9,
the peripheral surface of the respective second workpiece comprising mutually perpendicular flat sections.

15. The reflector dish of claim 9,
the rectangular main body of the reflector dish 2; 2' comprising a passivation or electroplating.

* * * * *